(12) United States Patent
Gialis (10) Patent No.: US 9,894,823 B2
(45) Date of Patent: Feb. 20, 2018

(54) ROTATING PERFORATED SUCTION CYLINDER FOR LEAF REMOVAL FROM PLANTS AND THE LEAF STRIPPING HEADS PROVIDED WITH SUCH A CYLINDER

(71) Applicant: Jean-Marc Gialis, Cheval Blanc (FR)

(72) Inventor: Jean-Marc Gialis, Cheval Blanc (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 587 days.

(21) Appl. No.: 14/539,598

(22) Filed: Nov. 12, 2014

(65) Prior Publication Data

US 2015/0201545 A1 Jul. 23, 2015

(30) Foreign Application Priority Data

Jan. 17, 2014 (FR) ...................................... 14 50387

(51) Int. Cl.
*A01G 17/02* (2006.01)
*A01B 41/04* (2006.01)

(52) U.S. Cl.
CPC .............. *A01B 41/04* (2013.01); *A01G 17/02* (2013.01); *A01G 17/023* (2013.01); *A01G 17/026* (2013.01)

(58) Field of Classification Search
CPC .......... A01B 41/00; A01B 41/04; A01G 3/04; A01G 3/0408; A01G 3/0435; A01G 3/053; A01G 3/0535; A01G 3/08; A01G 17/02; A01G 17/023; A01G 17/026; A01D 46/00; A01D 46/28; A01D 46/285

USPC .......... 460/134, 135, 140, 142; 56/330, 230, 56/235

See application file for complete search history.

(56) References Cited

U.S. PATENT DOCUMENTS

| 99,328 A * | 2/1870 | Lee ........................ A01B 41/04 |
| | | 172/546 |
| 325,584 A * | 9/1885 | Bartels .................... E01H 11/00 |
| | | 37/104 |
| 1,078,506 A * | 11/1913 | Lilliston ................ A01D 45/10 |
| | | 460/135 |

(Continued)

FOREIGN PATENT DOCUMENTS

| EP | 1657975 A1 | 5/2006 |
| FR | 2417932 A1 | 9/1979 |

(Continued)

*Primary Examiner* — Monica L Williams
*Assistant Examiner* — Michael A. Fabula
(74) *Attorney, Agent, or Firm* — Egbert Law Offices, PLLC (57) ABSTRACT

Perforated rotating attraction drum of a general cylindrical shape and featuring openings, this drum being fitted for being mounted on a leaf-stripping head of the leaves of a foliage wall such as a row of vine-stock, characterized in that it features the superposition of a plurality of rings presenting an outside cylindrical surface, and of a plurality of annular openings made between two successive rings, these openings allowing the passage of a suction air flow across and towards the inside of the perforated rotating attraction drum featuring, internally, means of rigid assembly of the plurality of stacked rings and a coupling means to a motorization for its rotational drive.

14 Claims, 9 Drawing Sheets

(56) References Cited

U.S. PATENT DOCUMENTS

| | | | | |
|---|---|---|---|---|
| 1,722,780 A * | 7/1929 | Wilkes | A01D 45/10 | 460/114 |
| 2,495,417 A * | 1/1950 | McConnel | A01D 41/08 | 56/129 |
| 4,022,001 A * | 5/1977 | Burton | A01D 46/28 | 56/330 |
| 4,077,193 A * | 3/1978 | Diggs | A01D 46/264 | 56/328.1 |
| 4,578,937 A * | 4/1986 | West | A01D 41/08 | 56/130 |
| 4,733,525 A * | 3/1988 | Pellenc | A01G 3/0408 | 56/235 |
| 4,905,460 A * | 3/1990 | Toman | A01B 45/026 | 56/12.7 |
| 5,174,093 A * | 12/1992 | Rodriguez | A01D 45/00 | 56/128 |
| 5,259,177 A * | 11/1993 | Windemuller | A01D 46/285 | 56/12.8 |
| 5,314,126 A * | 5/1994 | Alvarez | B02C 13/04 | 241/189.1 |
| 5,472,147 A * | 12/1995 | Doppstadt | B02C 13/284 | 241/101.74 |
| 5,791,129 A * | 8/1998 | Pellenc | A01G 3/0408 | 56/15.1 |
| 6,000,205 A * | 12/1999 | Joray | A01D 34/535 | 241/194 |
| 6,098,387 A * | 8/2000 | Pfisterer | A01G 1/125 | 56/16.4 A |
| 6,227,469 B1 * | 5/2001 | Daniels, Jr. | B02C 13/06 | 241/186.3 |
| 6,523,337 B2 * | 2/2003 | Spagnolo | A01G 17/02 | 56/15.5 |
| 6,871,485 B2 * | 3/2005 | Schafer | A01G 23/093 | 241/186.3 |
| 7,096,900 B2 * | 8/2006 | Schafer | A01G 23/093 | 144/24.12 |
| 7,278,597 B2 * | 10/2007 | Fenton | A01D 34/435 | 241/194 |
| 7,850,107 B2 * | 12/2010 | Schafer | B02C 13/04 | 241/189.1 |
| 7,870,712 B2 * | 1/2011 | Pellenc | A01G 3/0408 | 56/233 |
| 8,196,623 B1 * | 6/2012 | Heath | A01G 23/067 | 144/235 |
| 8,230,671 B2 * | 7/2012 | Pellenc | A01G 3/0408 | 56/235 |
| 8,984,852 B2 * | 3/2015 | Ferrandez | A23N 15/025 | 56/330 |
| 9,247,691 B2 * | 2/2016 | Andros | A01G 3/0408 | |
| 2003/0167746 A1 * | 9/2003 | Pellenc | A01G 17/026 | 56/330 |
| 2005/0081501 A1 * | 4/2005 | Pellenc | A01G 17/026 | 56/330 |
| 2006/0162309 A1 * | 7/2006 | Schloesser | A01G 17/02 | 56/255 |
| 2006/0230733 A1 * | 10/2006 | Fenton | A01D 34/435 | 56/12.7 |
| 2007/0129122 A1 * | 6/2007 | Pieroth | A01G 17/026 | 460/112 |
| 2008/0060335 A1 * | 3/2008 | O'Riley | A01G 3/08 | 56/234 |
| 2008/0236126 A1 * | 10/2008 | Leonini | A01D 46/28 | 56/330 |
| 2009/0057208 A1 * | 3/2009 | Pellenc | A01D 46/285 | 209/606 |
| 2012/0067188 A1 * | 3/2012 | Denis | A01D 34/52 | 83/665 |
| 2012/0073257 A1 * | 3/2012 | Pellenc | A01G 3/0408 | 56/235 |
| 2015/0164005 A1 * | 6/2015 | Gialis | A01G 17/026 | 47/1.43 |

FOREIGN PATENT DOCUMENTS

| | | | | |
|---|---|---|---|---|
| FR | 2808964 A1 | 11/2001 | | |
| FR | 2897752 A1 | 8/2007 | | |
| FR | 2965701 A1 | 4/2012 | | |
| GB | 2518594 A * | 4/2015 | | A01G 3/0535 |
| IT | EP 2883443 A1 * | 6/2015 | | A01G 17/026 |
| WO | 0187047 A1 | 11/2001 | | |

\* cited by examiner

ROTATING PERFORATED SUCTION CYLINDER FOR LEAF REMOVAL FROM PLANTS AND THE LEAF STRIPPING HEADS PROVIDED WITH SUCH A CYLINDER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns the field of leaf stripping of trees and shrubs. In particular, it applies to the manufacture of leaf-stripping heads suitable for fitting out leaf-stripping machines for shrubs and shrubby trees and, more specifically, machines for thinning foliage growing on vine-stock.

Its subject is a rotating perforated suction cylinder intended to be mounted on such machines working on the leaf-stripping principle of plastering the leaves on said rotating perforated suction cylinder through at least one suction air flow.

2. Description of Related Art Including Information Disclosed Under 37 CFR 1.97 and 37 CFR 1.98

It is known that in the specific area of vine-stock, it is very important, even crucial, to reduce the quantity of leaves present in the fruit-bearing area of the vine-stock, and to do this several times each season, during the entire ripening phase of the grapes, in order to promote or obtain the following objectives:

aerating of the grapes in order to limit the appearance of grey mold and other diseases, and accelerating their drying;

sun exposure of the grapes to accelerate and improve their maturation, particularly their coloring (thicker skin of the grapes);

improving the quality of the grape berries;

penetration of plant protective treatments to improve their efficiency, leaf-thinning or manual harvesting thanks to better visibility of the grapes and a significantly shortened labor time;

if applicable, facilitate mechanical harvesting through limiting green waste during the harvest and juice losses due to the suction of the leaves;

careful handling of the grapes regardless of their degree of ripening.

Leaf-stripping on vine-stock has been done manually for many years and if this is sometimes still the case, it is at present generally done mechanically with machines designed for this purpose. Most of these machines nowadays use the principle of a rotating perforated suction cylinder featuring or generating openings positioned directly on the foliage. Through these openings a low pressure is created by means of an air flow thereby plastering the leaves of the foliage on said rotating perforated suction cylinder in order to direct them towards cutting or leaf-stripping means.

It is to be noted that the suction at the foliage level does not only lead to an attraction of the leaves but also to the suction of other objects in the vicinity of the rotating perforated suction cylinder such as grape bunches. The leaf-stripping operation is in fact performed during the ripening phase of these bunches and may begin as soon as these berries have a diameter measured in millimeters, up to harvesting time when they present a diameter, depending on the vine-plants, in the order of 10 to 20 mm. These grape bunches are of course very fragile. During a first stage of their growth they have a diameter smaller than 5 mm, resembling small, fairly hard balls and are not very susceptible to being damaged by shocks, but they may become detached from the bunch during these shocks. During a second stage, the berries continue to grow and begin to become softer a phase during which they become more and more susceptible to blows and injuries by such shocks, facilitating the appearance of diseases which they will then propagate to the berry and even to adjacent berries. It is clear that the creation of shocks on the grape bunches has adverse effects and leads to:

1. a reduced quantity of healthy berries;
2. significant phyto-pathological risks to the vineyard;
3. increased consumption of plant-protective products.

Therefore, if mechanical leaf-stripping is done without particular precautions, the beneficial effects may be largely offset by the disadvantages described above.

Such machines are described and shown in particular in the following documents of the state of the art: EP-1.657.975, FR-2.897.752, WO-01/87047, FR-2.417.932, and FR-2.808.964.

The subject of the document EP-1.657.975 is a leaf-stripping device comprising a housing the proximal end of which is positioned facing the foliage and its distal end features a turbine sucking up the leaves of said foliage by creating a vacuum generated by the air flow if the turbine at the proximal end, said leaves being then grabbed by two drums of a general cylindrical shape driven by a counter-rotating movement, which is to say each rotating in a direction opposite to that of the other roll, in order to exert, through pinching, a sufficient stripping force on said leaves. The lateral surface of the first drum presents, from top to bottom, a profile in the form of notches, constituted by an alternation of ribs and superimposed grooves, whereas the lateral surface of the second drum presents a straight line profile. At the level of the opposing parts of the first and second drum, the grooves of the first drum associated with the cylindrical surface of the second drum generate superimposed grooves of reduced dimensions allowing the circulation of an air flow in the direction of the turbine and ensuring the plastering of the leaves, by suction, on the first drum. The rapid counter-rotating movement of the two drums guides the leaves plastered on the first drum to be pinched and then stripped off.

According to the machine described in the document EP-1.657.975, the openings thus created are reduced and are not sufficient to plaster the leaves over the entire part of the first drum situated opposite to the foliage wall. Furthermore, suction of the leaves of the foliage wall is hindered by the presence of the drums which form a screen to the suction air flow of said leaves channeled into the superimposed openings made between the two drums, which requires a significant suction force to compensate for the losses of suction and generates a high cost for energy. In addition, with such a device, the grape bunches in the process of ripening during this leaf-stripping stage, may be sucked up or damaged through said openings because these, to allow the passage of an air flow capable of sucking up the leaves of the foliage wall, are by necessity sufficiently large to be of a size greater than a not yet ripe grape berry as one might encounter during the leaf-stripping period. The turbulences created by the air flow in the openings lead to vibrations of the berry in the opening and the berry will inevitably sustain shocks at the contact with the walls of the opening. A reduction of the size of the openings in order to avoid the suction of these berries would, on the one hand considerably diminish the size of the openings and consequently the suction effect on the foliage leaves, and on the other hand, would facilitate the clogging of said openings with dust and small waste generated by the movement of the machine along the rows in the vineyard. Thus, under the operating conditions of the machine which is the subject of this document, many grape berries may be ripped off or damaged by the shocks in the openings.

The subject of document FR-2.897.752 is a leaf-stripping machine comprising a head provided with two counter-rotating drums, namely a first rotating, perforated attraction drum featuring openings constituted by a plurality of holes made in the lateral surface if said first drum, and a second drum without openings and cooperating with said first rotating, perforated attraction drum. The two drums have profiles that are essentially rectilinear, the first rotating, perforated attraction drum being associated with means of suction at one of its ends, generating an air flow at its inside capable of generating a vacuum at the level of its openings thereby enabling it to suck up the leaves of the foliage wall with which it is in contact. The leaves are then pinched between the two counter-rotating drums and are stripped from their branches.

However, with a machine of the type described in document FR-2.897.752, the grape berries in the process of ripening at this stage of the leaf-stripping may be sucked up or damaged through said openings because these, in order to allow the passage of an air flow capable of sucking up the leaves of the foliage wall, are in effect sufficiently large to be greater than a not yet ripe grape berry as one might encounter during the leaf-stripping period. Furthermore, while observing the operation of a cross section of the rotating perforated attraction drum at one of its openings while the machine is in operation, one understands that a grape berry coming into contact with a full portion of its cylindrical surface is going to be suddenly sucked up by the air flow at the portion of the cylindrical surface of the rotating, perforated attraction drum presenting an opening, then is going to return on a new full portion of its cylindrical surface. The grape berry will then penetrate, fully or partially, into the inside of the opening and may then be ripped off or at least sustain a shock and may be damaged when it contacts again the full cylindrical portion. Furthermore, taking into account the significant rotating speed of the rotating perforated attraction drum (in the range of 1000 rpm) this berry may thus be subject to be shocked and also damaged repeatedly at one opening, or even at a plurality of openings present on the cross section of the rotating perforated attraction drum at the level of the berry. A reduction of the size if the openings in order to avoid the suction of these berries would lead on the one hand to considerably reducing the size of the openings and consequently the suction effect on the foliage leaves, and on the other hand, would facilitate the clogging of said openings of reduced size with dust and small waste generated by the movement of the machine along the rows in the vineyard, but would not prevent even light shocks when the berries pass at the level of the openings. Thus, under the operating conditions of the machine which is the subject of this document, many grape berries may be ripped off or damaged by the shocks in the openings.

The present invention has the aim to provide solutions to the problems following from the disadvantages of the devices of the state of the technique by proposing a perforated rotating attraction drum featuring openings capable of functioning for example on machines of the state of the art cited above and allowing to ensure optimal leaf-stripping quality by performing suction and plastering of the leaves over the portion of said perforated rotating attraction drum opposite the foliage wall, while avoiding the generation, in these openings, of shocks on the grape berries resulting in damages or loss of grape berries, leading to major phytopathological risks in the vineyard, an over-consumption of plant-protective treatments and limiting the harvest of healthy grapes.

BRIEF SUMMARY OF THE INVENTION

According to the invention, the goal has been achieved by producing a perforated rotating attraction drum that can be mounted on a leaf-stripping head working on foliage wall of a row of vine-stock, said leaf-stripping head featuring driving means for providing the rotation of said perforated rotating attraction drum, as well as the means for generating an air flow creating a vacuum in said openings to plaster the leaves of the foliage wall on the surface of said perforated rotating attraction drum when it is positioned opposite said foliage wall, this perforated rotating attraction drum being primarily remarkable in that it consists of the superposition of a plurality of rings presenting an external cylindrical surface and a plurality of ring-shaped openings made between two successive rings, these openings allow the passage of a suction air flow through and towards the inside of the perforated rotating attraction drum featuring, internally, rigid assembly means for the plurality of stacked rings and a coupling mechanism to a motorization for its rotating drive.

According to an advantageous implementation, the means for rigid assembly of the rings comprise, on the one hand, assembly humps positioned at a distance from the periphery of the rings and connected to the inside wall of said rings, said humps featuring axial bores parallel to the axis of the rings and, on the other hand, rigid rods traversing the bores of the humps of said superposed rings.

According to another implementation, the means for coupling the drum to a motorization capable of performing the rotating drive of the drum, comprises, on the one hand, a central sleeve attached to the inside wall of each end ring, for example through radial struts, and, on the other hand, an axial coupling shaft traversing the bores of each central sleeve and linked in rotation on the latter by means such as pins or locking screws, said shaft being fitted so as to permit the coupling, directly or indirectly, to the motorization of the rotating drive of the drums in a manner known as such, for example, the axial shafts of each drum being linked by pinions, one of these pinions being connected to the pinion coupled to a hydraulic motor.

In this manner, a perforated rotating attraction drum can easily work together with a cylindrical counter-rotating drum inside a machine comprising a leaf-stripping head such as described in the state of the art to ensure the pinching and stripping of the leaves of the foliage wall that have previously been plastered by the suction force on the perforated rotating attraction drum.

On such a perforated rotating attraction drum one can just as well generate an air flow across the openings in an axis perpendicular to the axis of the perforated rotating attraction drum, for example by creating this air flow through a turbine positioned at the rear or the assembly constituted by the two drums opposite the foliage wall, or more advantageously, by creating this air flow through the openings and towards the interior of the perforated rotating attraction drum by positioning for example the air inlet of a turbine sucking the inside air of the perforated rotating attraction drum at the level of one or even of its two perforated end rings. And in an even more advantageous manner, it is desirable to channel this air flow at the level of the portion of the perforated rotating attraction drum opposite the foliage wall by positioning a screen such as for instance a metal plate in the shape of a circle arc opposite the of surface of the perforated rotating attraction drum on which [surface] the openings have no functional action with respect to the foliage wall.

One understands also that the annular openings present a reduced height in order to avoid damaging the grape berries inside the foliage wall and which could be sucked up at said openings. The berry is in this case accompanied to the surface of the opening while maintaining at least a partial contact with at least one of the surfaces of the rings positioned on either side of this opening and preventing in this way said berry from penetrating into this opening and sustaining there any shock. In this way, the surface of the berry opposite the opening is very small and limits thereby the efforts of attraction of said berry on this opening, the berry being thus less susceptible to the suction at the opening and able to detach itself quickly from it without any damage when it is previously brought into contact with it. On the other hand, a leaf having in effect a large surface opposite the perforated rotating attraction drum will be submitted to attraction efforts on the latter at several openings, facilitating its holding on the surface of said perforated rotating attraction drum.

Of course, in case of very early leaf-stripping, it is then possible that the size of the berries is sufficiently small to enter into the opening, but the attraction efforts on said berry are then very weak, the shocks it could sustain there are not harmful at this stage for the quality of the berry at the time of harvest and it is also sufficiently light to avoid being ripped off too easily and above all, the growth of the berries is very rapid and it will not find itself in the same situation during the next leaf-stripping operation.

According to one implementation, the annular openings separating the rings have a height between 2 mm and 5 mm, and, preferably, a height of 3 mm.

Advantageously, each ring has a minimum of two, preferably three humps featuring bores the axes of which are parallel to the axis of the ring and positioned preferably at equal angular distance from each other on a concentric circle of a diameter smaller than that of the ring. Thus, each ring presents a significant perforated internal surface to facilitate the circulation of the air flow inside the perforated rotating attraction drum and to limit load losses.

According to another characteristic disposition, the humps have a height greater than the thickness of the rings, so that during the stacking of the rings on the rigid rods, an annular opening is automatically made between two adjacent rings.

According to an advantageous implementation, the upper and lower ends of the humps extend over the upper and lower faces of the rings over an identical distance, for example in the order of 1.5 mm. In this way, when two rings are superposed, an annular opening of a height in the order of 3 mm is made between two adjacent rings.

According to an advantageous implementation, the upper end of each hump of a ring features a countersink whereas its lower end features a shoulder so that the hump at the lower end of a ring can fit into the hump at the upper end of the next ring during stacking In this way, and combined with the assembly on rigid rods, this system reinforces the final rigidity of the perforated rotating attraction drum.

According to an advantageous implementation, the perforated rotating attraction drum features also inserts in the stacking between two rings so that the height of the thickness of said means can be increased. This characteristic has the advantage that the height of the openings can be adjusted depending on the vineyards worked, the leaf-stripping period or the condition of the vegetation at the time of leaf-stripping. Another, not insignificant advantage is that drum with different heights can be produced while using the same rings.

According to an advantageous implementation, the height adjustment is obtained by using washers of equal thickness between them positioned in each countersink of the upper end of the humps of a ring.

According to one implementation, the stacking of rings of the perforated rotating attraction drum is terminated, at each of its ends by an end ring presenting an outside diameter identical to the outside diameter of the stacking rings, each end ring is provided with assembly humps featuring bores fitted for receiving the rigid rods of the ring stacking, the stiffening of the assembly being achieved by blocking means which are constituted, for example, by screw-nut systems, preferably locknuts which are screwed on to the threaded ends of the rigid rods.

The invention also concerns a leaf-stripping head which is remarkable in that comprised:
  a perforated rotating attraction drum featuring one or several of the aforementioned characteristics;
  at least one means of suction for creating an air flow across the openings of said perforated rotating attraction drum, to ensure an effort of attraction of the leaves of the foliage wall facing said drum; and
  a second counter-rotating drum presenting an external lateral wall of a generally cylindrical shape and mounted opposite the stack of rings of the perforated rotating attraction drum, so as to ensure the pinching of the leaves plastered on the latter.

According to an advantageous implementation, the suction device or each suction device is constituted by a suction turbine installed above the upper end of the perforated rotating attraction drum and/or below the low end of the latter, so as to generate, inside the interior vacuum of said perforated rotating attraction drum, a suction air flow beginning at one at least of said ends, this suction air flow allowing to grab and to hold the leaves against the lateral cylindrical surface of the perforated rotating attraction drum positioned opposite the foliage wall.

According to another advantageous implementation, the suction air flow is essentially generated over a front area of the lateral surface of the perforated rotating attraction drum, and more precisely over the circle arc portions of the openings placed in this area. It extends towards the back after the passage of counter-rotating roll to accompany the leaves on the perforated rotating attraction drum and prevent that they do not stick to the wall of the counter-rotating roll.

According to a preferred implementation, the leaf-stripping head features a screen that is fastened to said leaf-stripping head, by fasteners, opposite the portions of the openings located opposite the non-functional suction areas. By non-functional area is meant an area where the leaves are no longer held by suction on the perforated rotating attraction drum. This area begins shortly after the pinching of the leaves with the counter-rotating drum and thus allows stripping the leaves from the perforated rotating attraction drum but without enabling them to be drawn and stuck to the counter-rotating drum.

According to another example of implementation, the leaf-stripping head comprises cleaning means extending towards the inside of the perforated rotating attraction drum beyond the lateral wall of the latter.

According to another preferred example of implementation, these cleaning means consist of a plurality of superposed blades fixed rigidly on the screen and shaped so they engage in the openings so that they can continually clean said openings when the perforated rotating attraction drum is in rotation.

The invention also refers to leaf-stripping machines equipped with a leaf-stripping head featuring one or several of the technical characteristics above.

BRIEF DESCRIPTION OF THE SEVERAL VIEWS OF THE DRAWINGS

The invention will be better understood, thanks to the description below which refers to a preferred implementation, given as a non-limiting example and explained with reference to the attached schematic drawings in which.

Reference to said drawings is made to describe an interesting but by no means limiting example of implementation of a perforated rotating attraction drum for the leaf-stripping of plants and the leaf-stripping heads equipped with such a drum.

DETAILED DESCRIPTION OF THE INVENTION

In the description which follows and in the claims, the term 'attraction drum' designates a cylinder comprising a perforated lateral wall to allow passage of a suction air flow for grabbing the leaves of the foliage wall and to hold them against the external surface of said perforated cylinder.

Figure 1:
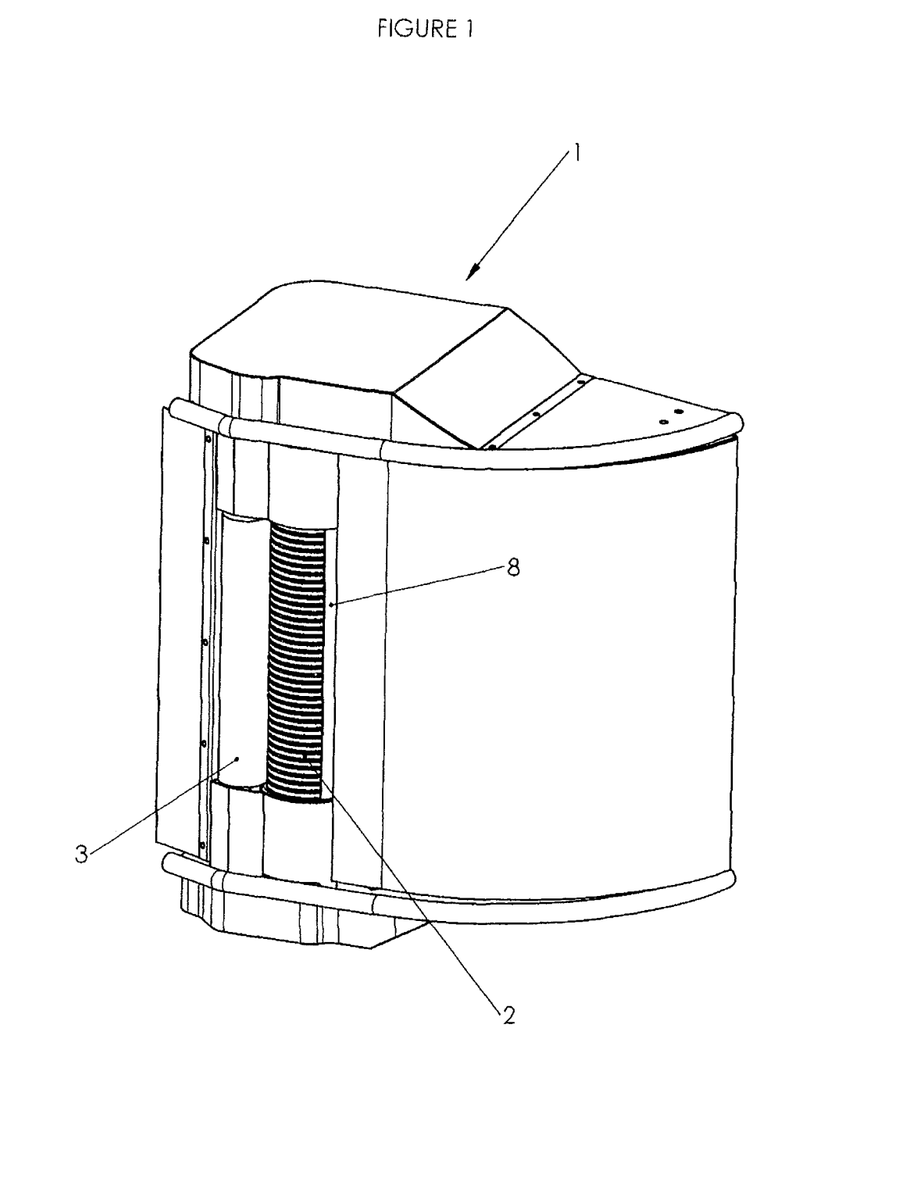
FIG. 1 shows a perspective view of an example of leaf-stripping head incorporating the perforated rotating attraction drum in accordance with the invention.

On FIG. 1 is represented a preferred mode of utilization of the perforated rotating attraction drum according to the invention showing a leaf-stripping head 1 incorporating said perforated rotating attraction drum 2 cooperating with a counter-rotating drum 3 as well as means for the rotating drive of said perforated rotating attraction drum 2 and means for generating an air flow capable of creating a vacuum at the openings of said perforated rotating attraction drum according to an operating mode similar to the state of the art described above. In effect, these different means are known by the expert and are not represented on the figures, since they are not the subject of the invention as such.

Figure 2:
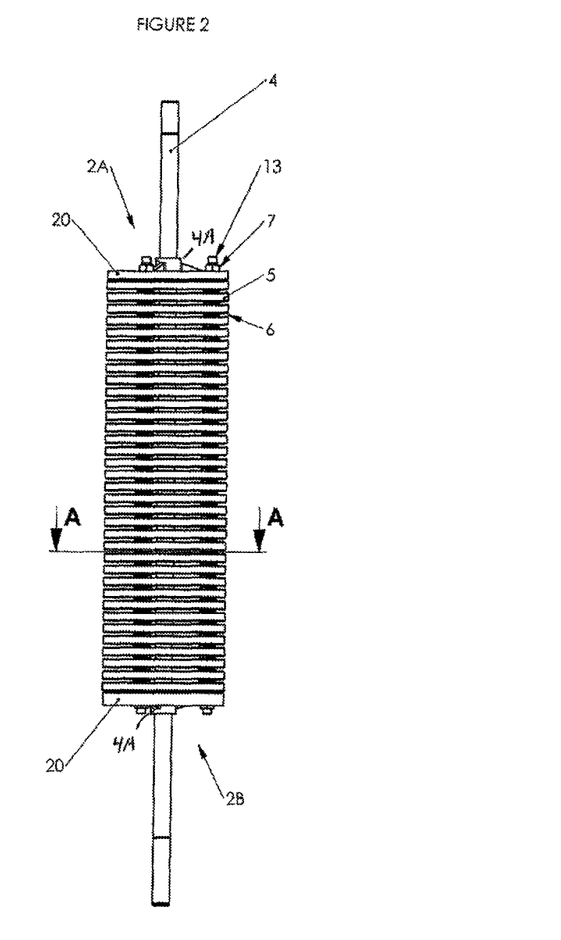
FIG. 2 shows a front view of the perforated rotating attraction drum according to the invention mounted on its rotating shaft.
Figure 3:
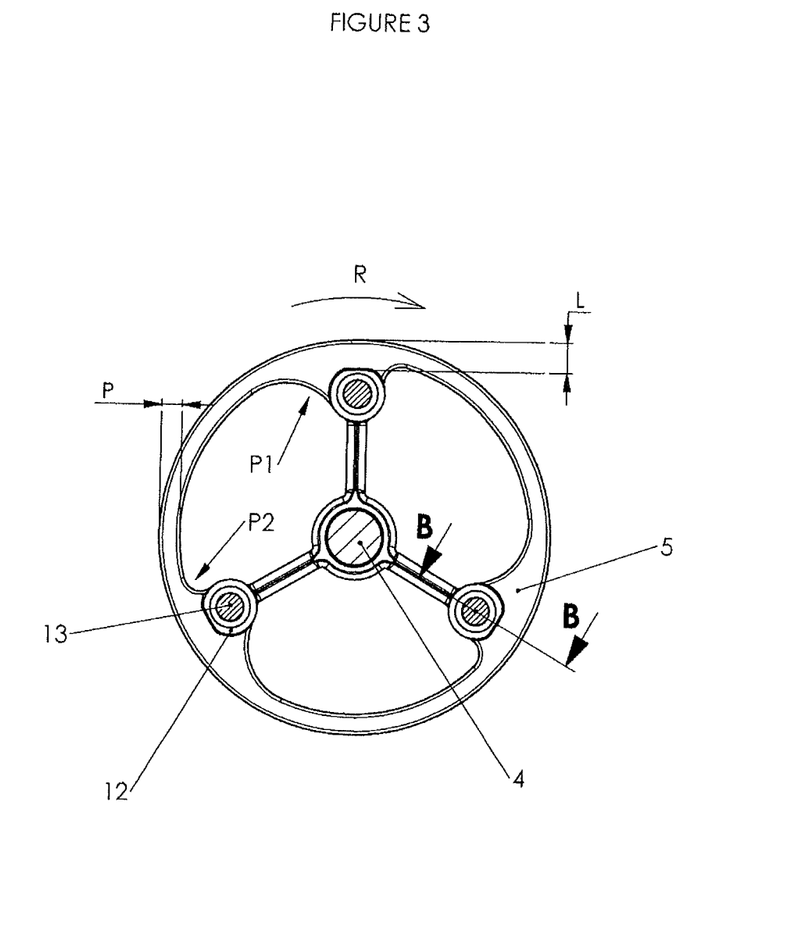
FIG. 3 shows a cross section view along the plane A-A of FIG. 2.

FIG. 2 shows a preferred implementation of the perforated rotating attraction drum 2 of a general cylindrical shape and featuring annular openings 6, this perforated rotating attraction drum being fit for being mounted to a shaft 4 on a leaf-stripping head 1 by couplers 4A for allowing the elimination of a certain quantity of leaves of a foliage wall constituted by a row of vine-stock. This head features means for motorization known as such to drive the rotation of said perforated rotating attraction drum, as well as means also known as such, allowing the creation of an air flow generating a vacuum in said openings 6 to suck the leaves of the foliage wall on the surface of said perforated rotating attraction drum 2 when it is positioned at the level of the surface of said foliage wall. This perforated rotating attraction drum presents a lateral surface of a general cylindrical shape extending between its two ends 2A, 2B, and it is primarily remarkable in that it is constituted by a successive stack of cylindrical rings 5 of identical diameter and separated by openings 6 of a general annular form. In other words, the perforated rotating attraction drum 2 is constituted by an alternation of rings and annular openings. These openings are shaped so as to prevent, during the suction operation of the leaves, the shocks on the other components of this foliage wall such as the grape berries which would be susceptible of regaining contact with the openings 6 of said perforated rotating attraction drum 2.

Advantageously, the openings 6 are of low height, for example of a dimension of 3 mm, to present a weak suction surface and hence a limited effort or attraction effect on the small objects related to the foliage wall other than the leaves, such as grape berries in the process of ripening, and in the event the latter are being sucked up, to accompany them without shocks until said objects are returned to the foliage wall by their connection to it, such as for example the grape bunches.

Advantageously, the perforated rotating attraction drum 2 is constituted by a successive assembly of rings 5, completed at each of its ends by an end ring 20, stacked around a common rotating axis represented by the axial coupling shaft 4 at the leaf-stripping head 1, as shown on FIGS. 2, 3, 8, and 9. This perforated rotating attraction drum features means of assembly 12, 13, and 7 of this stack of rings, constituted in the preferred implementation shown in particular in FIGS. 2, 3, 8, and 9 by three rigid thread rods at each of their ends traversing longitudinally the perforated rotating attraction drum 2 from one end to the other, passing through the bores of the humps 12 of each of the rings and positioned at equal angular distance from each other, which is here at 120°. Blocking means 7 such as locknuts complete the rigidity of the stack of rings and to suppress any play between the rings thus making it possible to prevent any ill-timed movements of the ring walls which could generate shocks to the grape berries in contact with the openings. The means of assembly 12, 13, and in particular the humps 12 provided with a traversing bore, are positioned nearby and set back from the periphery of the rings 5. In other words, said humps are positioned at a distance and inside of the volume delimited by the peripheral surface of the rings. This allows partly to sufficiently stiffen the stacking assembly rotating at high speed (for example in the order of 1000 rpm), but above all to define ring-shaped openings of large volume while maintaining a reduced thickness. The air flow can then create its effects over almost the entire surface of the openings 6, being disturbed only by the proximity of the humps 12.

Figure 4:
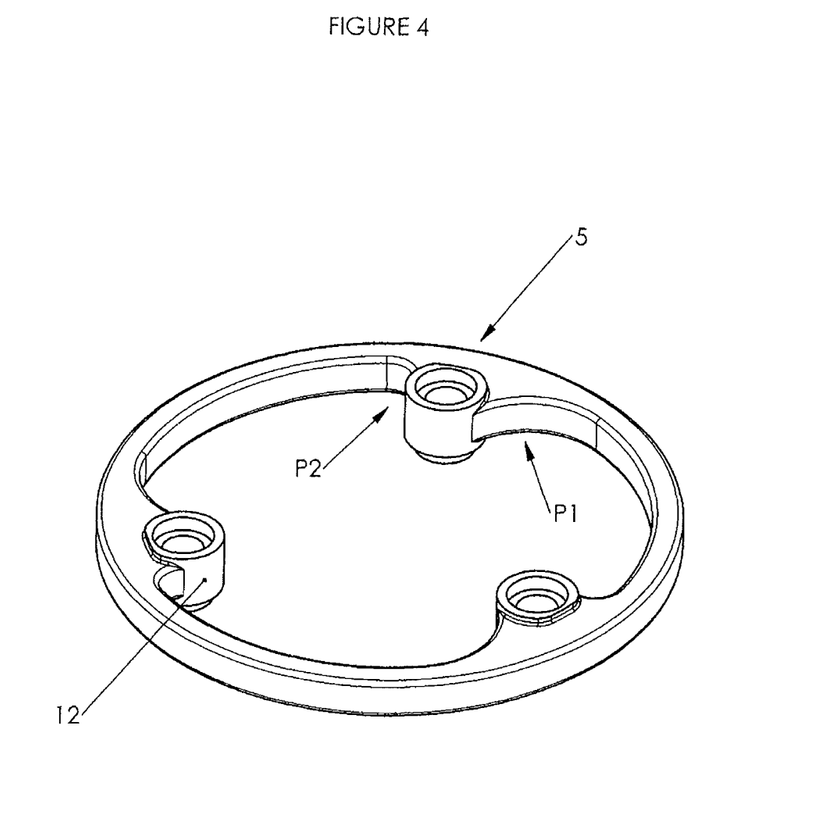
FIG. 4 shows a perspective view of one of the rings constituting the stacking of the perforated rotating attraction drum.

Advantageously, the periphery of each ring 5 is constituted between two humps 12 of a wall of a width P and the wall of the humps at proximity of the periphery of the ring 5 is distant from the latter by a width L greater than P to allow the passage of the cleaning means 9 described below during the operation of the leaf-stripping head.

Advantageously, each hump 12 has a general cylindrical shape but that is truncated in its part near the periphery of the ring 5 to allow the passage of the cleaning means 9 while also allowing positioning the axis of the rigid rods 13 as much as possible towards the periphery of the rings 5.

The stacking means 12, 13 provide, among other things for positioning the rings 5 at a predefined distance from each other so as to constitute the annular openings 6 of the perforated rotating attraction drum 2.

The humps 12 have a height H greater than the thickness e of the rings 5.

Figure 5:
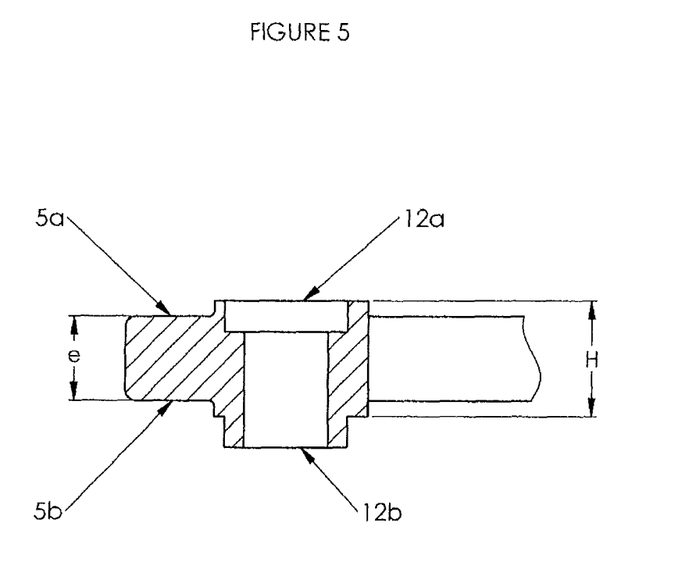
FIG. 5 is a detail view, at enlarged scale and in section of a ring along line B-B of FIG. 3.

Advantageously, the upper end 12a and the lower end 12b of the humps 12 extend over the upper face 5a and the lower face 5b of the rings 5, for example over an identical distance in the order of 1.5 mm (FIG. 5). In this way, when two rings 5 are stacked, an annular opening 6 of a height in the order of 3 mm is automatically made between these two adjacent rings.

Figure 6A:
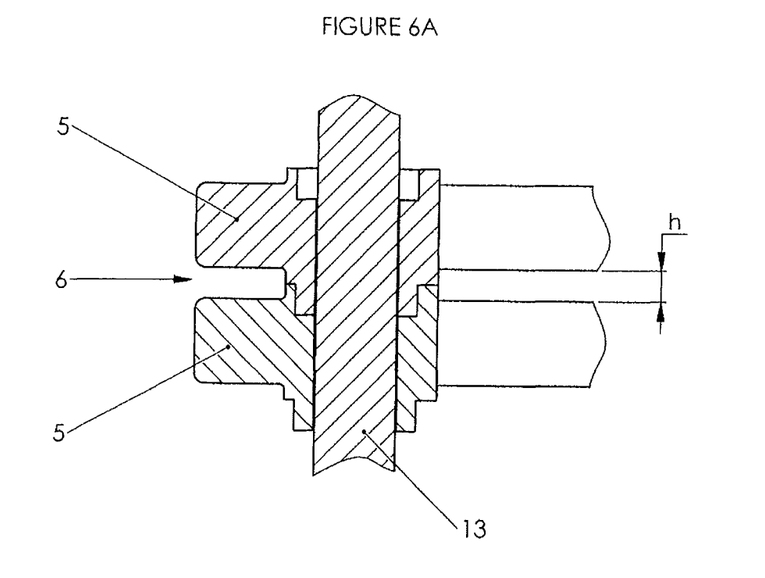
FIG. 6A is a detail view in longitudinal section analog to FIG. 5 showing a first implementation of the assembly of two superposed rings.

According to another characteristic disposition of the invention, the upper end 12a of the hump 12 of the upper face 5a of a ring 5 features a countersink and the lower end 12b of the hump 12 of the lower face 5b of the ring 5 features a shoulder so that the shoulder of the end 12b of a ring fits into the countersink of the end 12a of the adjacent ring at the moment of stacking the rings on to the rigid rods 13. This characteristic enhances the rigidity of the stack.

According to another characteristic disposition of the invention, the perforated rotating attraction drum 2 also features means of thickness h1 to allow increasing the height h of the openings 6, that is to say the size of the intervals between two successive rings 5. Thus, the height h of the opening 6 finds itself increased by the thickness h1 of said means. This characteristic has the advantage of allowing adjustment of the height of the openings depending on the vineyards being treated, on the leaf-stripping period or the condition of the vegetation at the time of leaf-stripping, but also of being able to manufacture different leaf-stripping drums with different opening thicknesses while still using the same rings.

Figure 6B:
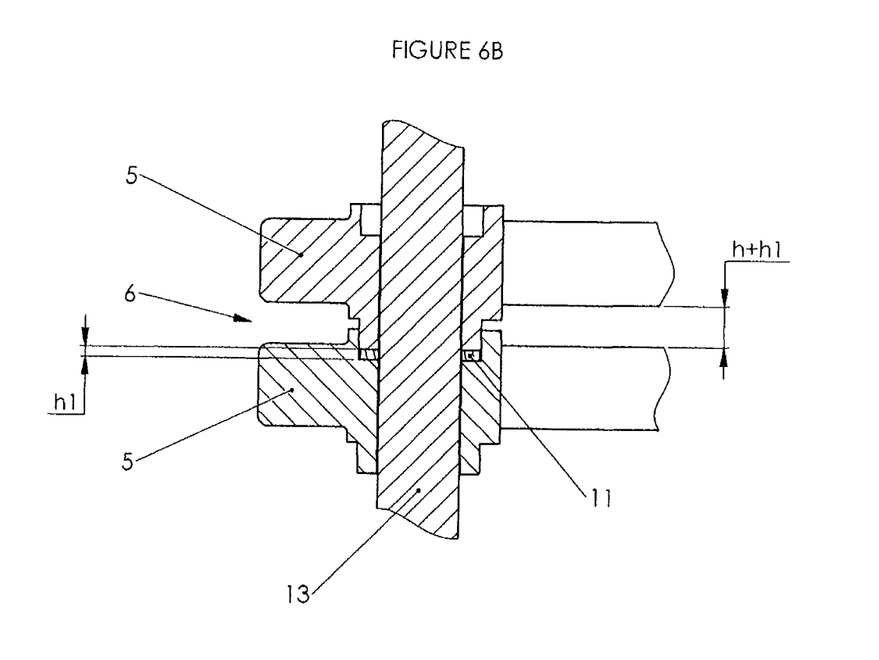
FIG. 6B is a detail view in longitudinal section analog to FIG. 5 showing a second implementation of the assembly of two superposed rings.

According to an advantageous implementation, the adjustment means for the opening height are constituted by washers 11 of a thickness h1 placed between two adjacent rings 5. According to a preferred example of implementation as shown in FIG. 6B, the height adjusting washers 11 are inserted into the countersinks of each of the upper ends 12a of the humps 12 of a ring 5.

According to another example of implementation, this height difference could be obtained with different rings 5 of same thickness e presenting humps 12 of different heights so that the stack of two successive rings would create openings 6 of different heights h.

The ends 2A, 2B of the perforated rotating attraction drum 2 are constituted by end rings 20 (FIG. 7) presenting an outside diameter identical to the outside diameter of the intermediary rings 5. These end rings are also provided with assembly humps 17. These end rings 20 are fastened by means of rigid rods 13 traversing the hump alignments 17-12-17, the stiffening of the assembly is achieved by blocking means 7, which are, for example, constituted by screw-nut systems, preferably locknuts being put on the threaded ends of the rigid assembly rods 13. This assemblage thus allows fastening the structure of the perforated rotating attraction drum and ensures its rigidity when it is in operation, preventing any relative distortions of the rings which could lead to distortions of the openings which could result in shocks to the grape berries.

Figure 7:
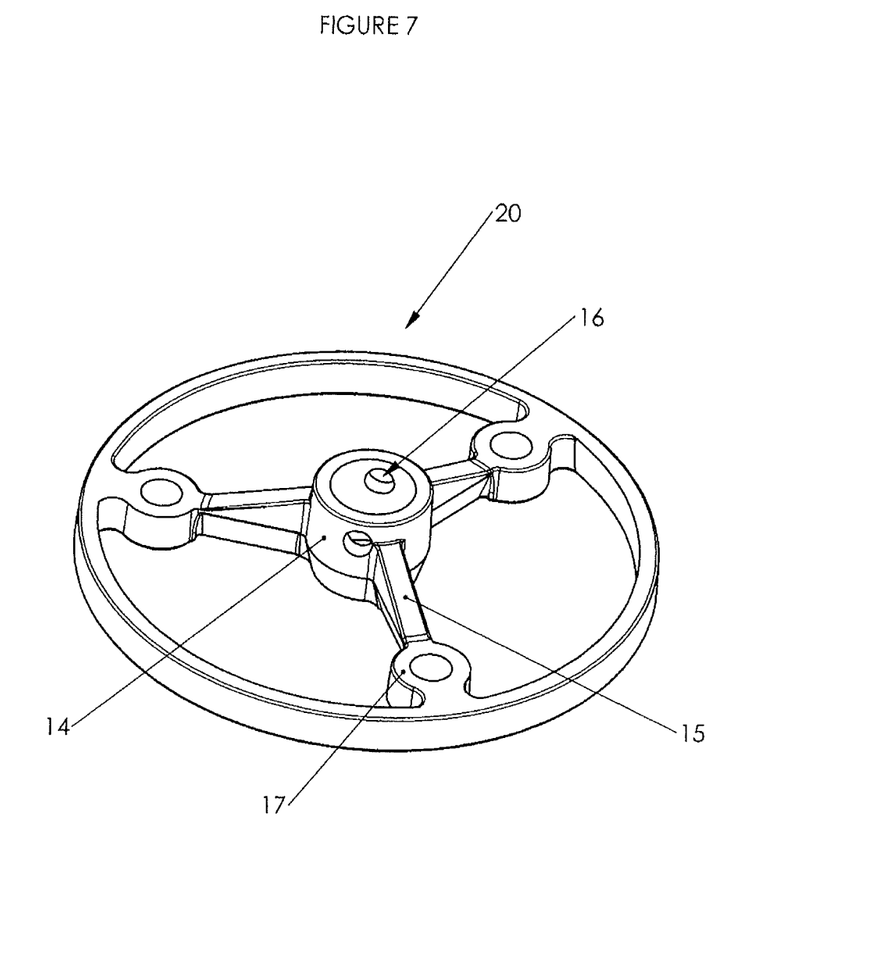
FIG. 7 shows a perspective view of one of the two end rings.

The perforated rotating attraction drum 2 is equipped with an axial shaft 4 fitted to allow its coupling, directly or indirectly, to a motorization for rotating drive. This shaft passes through a central sleeve 14 with which the end rings 20 are equipped, this central sleeve being rigidly connected, through radial cross-members 15, to the humps 17 of the end rings, or to their internal wall. Means ensure the rigid connection of the drive shaft 4 with the perforated rotating attraction drum 2. For example, these means consists of screws (not shown) traversing radial bores 16 as well as the sleeves 14 thereby joining the perforated rotating attraction drum solidly to the axial shaft for its rotating drive.

The invention concerns also the leaf-stripping heads 1 comprising a perforated rotating attraction drum 2 featuring all or part of the characteristics previously described, as well as the machines equipped with such a leaf-stripping head.

In this case, the attraction device enabling the foliage of the vine-stocks to be plastered against the lateral wall of the attraction roll constituted by a stack of rings 20-5-20 separated by annular openings 6, comprises at least one means of suction so as to generate a sucking air flow inside the perforated rotating attraction drum 2.

This suction device or each suction device maybe constituted by a suction turbine (not shown in the figures) where the air inlet may be installed above the upper end 2A of the perforated rotating attraction drum and/or below the low end 2B of the latter, so as to generate, inside said perforated rotating attraction drum, a sucking air flow from at least one of said ends 2A, 2B, this sucking air flow allowing the leaves to be grabbed and plastered against the cylindrical lateral surface of the perforated rotating attraction drum 2, through the openings 6. In this case, the internal portion of the perforated rotating attraction drum and hence that of the stack of rings 5 is put into communication with the air inlet of a channel connected to the main inlet of the suction turbine.

As an alternative or as a complement, the suction air flow may be generated through an area of the lateral surface of the perforated rotating attraction drum 2 to plaster the grabbed leaves by the suction air flow, and more precisely through the circle arc portions of the openings 6 positioned in this area.

A cutting device or nipping system may be associated with the perforated rotating attraction drum 2 to cut or nip the leaves plastered against said roll before detaching them from it.

According to an advantageous implementation, the leaf-stripping head comprises a second counter-rotating drum 3. This counter-rotating drum presents an external lateral cylindrical wall and it is mounted facing the external cylindrical surface of the stack of rings 20-5-20, so that it can nip and rip off the leaves plastered on the perforated rotating attraction drum 2.

It features an axial drive shaft in rotation and its surface is preferably constituted by an elastic material such as for example rubber or polyurethane in order to better nip the leaves and absorb their varying thicknesses due to their ribs and leaf-stalks.

The leaf-stripping head 1 thus shaped may be suspended in a manner known as such and at the grasp of the expert, on the chassis of a leaf-stripping machine.

The internal surface of the rings 5 may also comprise, between two stacking means 12 and by going in the direction of rotation R of the perforated rotating attraction drum, a first concave surface P1, a cylindrical wall of width P and a second concave surface P2 of a smaller radius than that of the concave surface P1. In effect, the perforated rotating attraction drum 2 sucks up all the small pieces of trash, waste and dust found in the foliage wall, but not connected to it, in proximity of the perforated rotating attraction drum during the leaf-stripping operation. This garbage tends to accumulate particularly on the surfaces where the air flow is reduced and often where the turbulences generated by the air flow force it to stagnate locally and to stick to the walls nearby. The advantage if a greater radius with a concave profile P1 is thus to facilitate sufficient air speeds at this level to prevent the rapid clogging of the openings, where clogging at the level of profile P2 is such that it is easily cleaned by the cleaning means 9 of the rings 5.

The rings 5 may be made of a metallic material such as aluminum or stainless steel, but they may advantageously made of plastic material, preferably molded, whereas the end rings are preferably made of a light metallic material such as aluminum to absorb efficiently the forces of the stacking The rigid rods linked to the stacking means 12 as well as the rotating drive shaft 4 of the perforated rotating attraction drum will preferably be made of steel. This structure is thus simple to assemble and lightweight, the perforated rotating attraction drum being in fact intended to operate at rapid rotating speeds, for example in the order of 1000 rpm, to ensure efficacious leaf-stripping.

Figure 8:
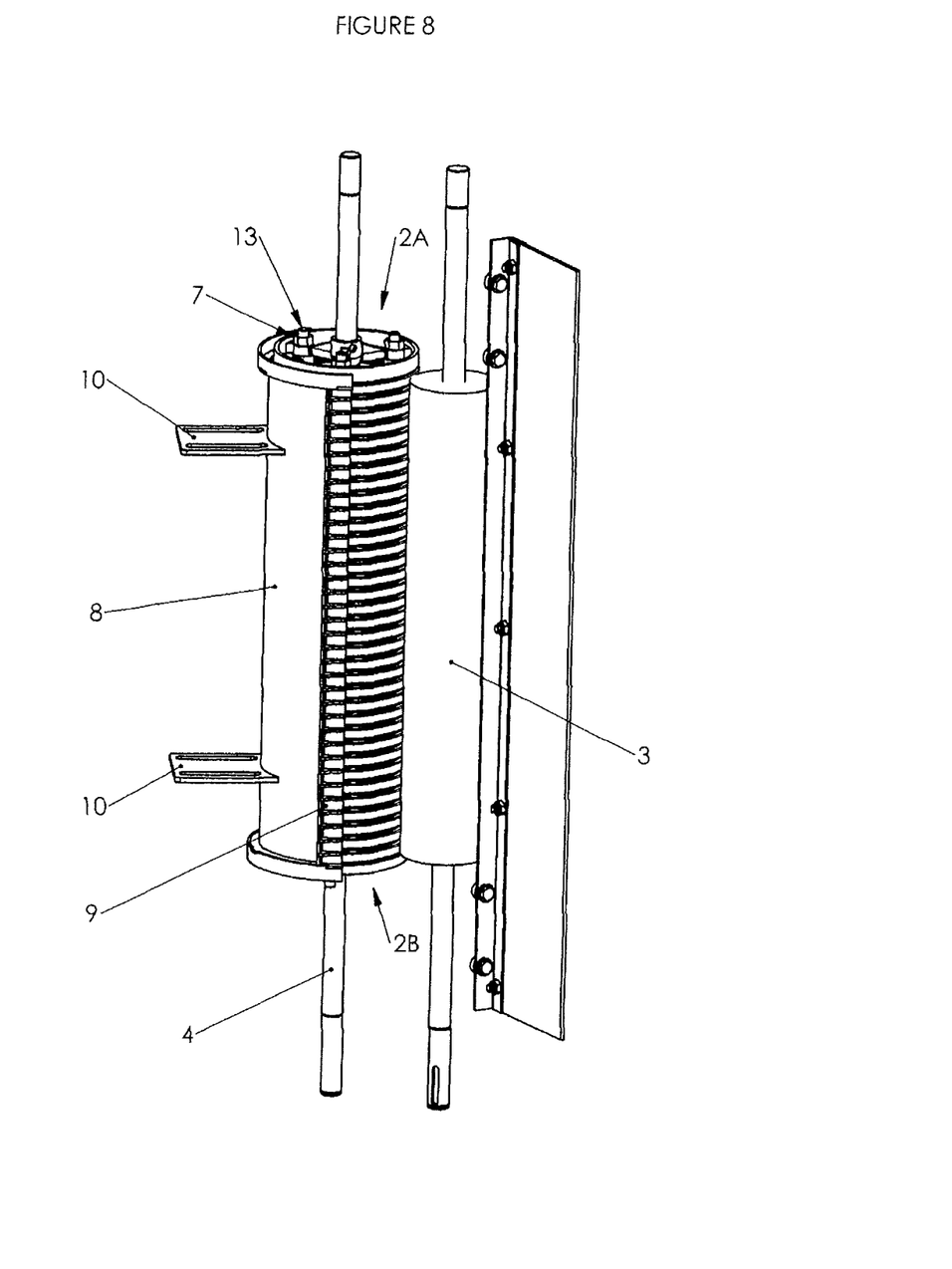
FIG. 8 is a cutaway drawing in perspective of the leaf-stripping head of FIG. 1 seen from the side opposite the foliage wall showing the location of the two counter-rotating rolls as well as the screen of the perforated rotating attraction drum featuring the cleaning elements for the openings.
Figure 9:
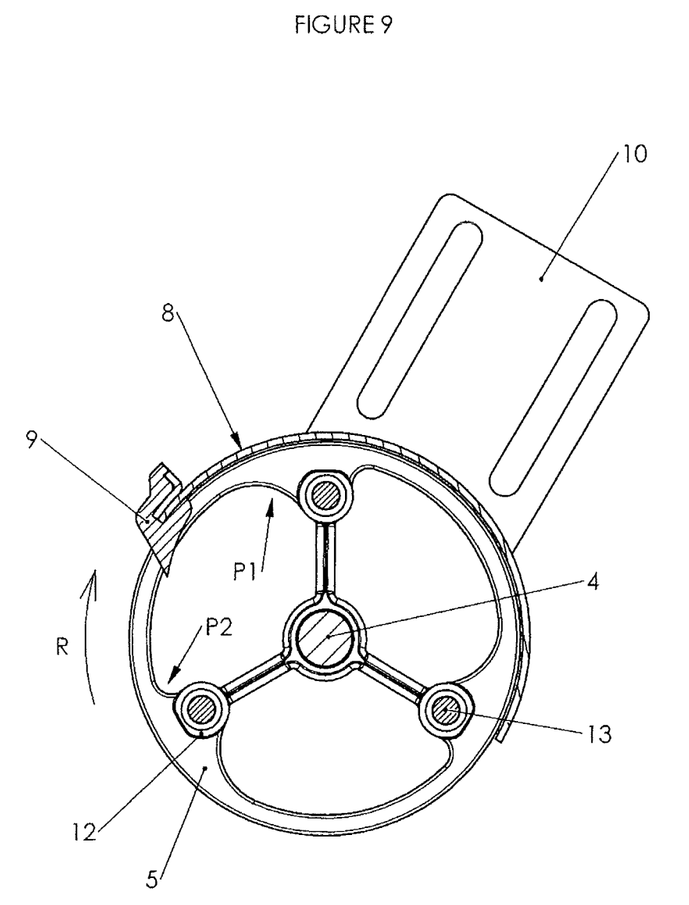
FIG. 9 shows the structure of the cleaning elements of the perforated rotating attraction drum coupled to the screen of said perforated rotating attraction drum shown in FIG. 6 along the same plane A-A of FIG. 2.

Also, in the preferred implementation of the perforated rotating attraction drum operating with one or two air flows, each linked to the ends 2A, 2B and to optimize the energy related to the generation of the air flow(s) through the annular openings 6, it is advantageous to limit the active portion of the latter to the area facing the foliage wall corresponding essentially to the leaf plastering area. A screen 8 may therefore be fastened on the leaf-stripping head 1 with appropriate fasteners 10 to be positioned opposite the portions of openings 6 facing the non-functional suction areas and to direct the suction of leaves primarily towards the foliage wall. What is meant by non-functional area is an area where the leaves are no longer plastered by suction on the perforated rotating attraction drum. This area begins shortly after the nipping of the leaves with the counter-rotating drum and thus permits detaching the leaves from the perforated rotating attraction drum without them being unable to be attracted and plastered by the counter-rotating drum. It will also have the advantage of proceeding to the detachment of the leaves after they have been stripped off by the counter-rotating drums by suppressing the attraction force as soon as they reach the screen. They can thus fall by gravity to the ground below the leaf-stripping head.

Advantageously, this screen 8 may integrate means for continuous cleaning 9 of the rolls located across the openings 6 which are thus fixed relative to the leaf-stripping head 1, and mobile relative to the perforated rotating attraction drum 2 and thus relative to the cylindrical rings 5.

The cleaning means 9 are for example constituted by a plurality of superposed blades fastened rigidly on the screen 8 connected to the machine and shaped to become engaged in the openings 6 so as to be able to continually clean said openings. Their end extends towards the inside of the openings of the perforated rotating attraction drum, beyond the wall with a thickness P of the cylindrical rings 5 although without touching the stacking means 12 of the rings positioned at a distance L from the exterior cylindrical surface of the rings 5, at a distance greater than the thickness P of the cylindrical wall of said rings. By the way, they have a thickness that is less than the distance between two adjacent rings and they are for example constituted by a steel sheet of 2 mm thickness to maintain sufficient operating play with the rings between which they are located, thus avoiding a loss of too much energy by friction with said rings while all the same providing continuous cleaning of the openings.

I claim:

1. A perforated rotating attraction drum for mounting to a leaf-stripping head used for stripping leaves of a foliage wall, the perforated rotating attraction drum comprising:
    a plurality of rings that are superimposed upon each other, said plurality of rings defining a cylindrical exterior surface;
    a plurality of openings respectively formed between successive rings of said plurality of rings, said plurality of openings allowing an axial passage of a suction airflow through an interior of said plurality of rings to an end of the perforated rotating attraction drum, said plurality of rings being rigidly assembled together; and
    a coupler positioned internally of said plurality of rings, said coupler adapted to couple said plurality of rings to a motor of the leaf-stripping head.

2. The perforated rotating attraction drum of claim 1, further comprising:
    a pair of end rings respectively mounted at opposite ends of said plurality of rings, said pair of end rings each having an outer diameter identical to an outer diameter of each of said plurality of rings.

3. The perforated rotating attraction drum of claim 2, said coupler comprising:
    a central sleeve attached to an inside wall of each of said pair of end rings through cross-members; and
    an axial coupling shaft extending through a bore of said central sleeve.

4. The perforated rotating attraction drum of claim 1, further comprising:
    a plurality of assembly humps located away from a periphery of said plurality of rings and connected to an inner wall of said plurality of rings, each of said plurality of assembly humps having a bore with an axis parallel to an axis of said plurality of rings; and a plurality of the rigid rods traversing respectively the bores of said plurality of assembly humps, each of said plurality of rigid rods having a nut at an end thereof.

5. The perforated rotating attraction drum of claim 4, each of said plurality of rings having at least two assembly humps, the bores of the assembly humps located at an equal angular distance from each other on a concentric circle having a diameter less than a diameter of said plurality of rings.

6. The perforated rotating attraction drum of claim 4, each of said plurality of assembly humps having a height that is greater than a thickness of each of said plurality of rings.

7. The perforated rotating attraction drum of claim 4, each of said plurality of assembly humps having an upper end and a lower end that extend over an upper face and a lower face respectively of the ring by an identical distance.

8. The perforated rotating attraction drum of claim 1, each of said plurality of openings having a height of between 2 millimeters and 5 millimeters.

9. The perforated rotating attraction drum of claim 1, further comprising:
an adjustment mechanism located between adjacent rings of said plurality of rings so as to allow an increase in a height of the opening between the adjacent rings.

10. The perforated rotating attraction drum of claim 9, said adjustment mechanism comprising washers of equal thickness.

11. A leaf-stripping head comprising:
a perforated rotating attraction drum comprising:
a plurality of rings that are superimposed upon each other, said plurality of rings defining a cylindrical exterior surface;
a plurality of openings respectively formed between successive rings of said plurality of rings, said plurality of openings allowing an axial passage of a suction airflow through an interior of said plurality of rings to an end of the perforated rotating attraction drum, said plurality of rings being rigidly assembled together; and
a coupler positioned internally of said plurality of rings, said coupler adapted to couple said plurality of rings to a motor of the leaf-stripping head; and
a counter-rotating drum having generally cylindrical shape on an outer wall thereof and mounted opposite said plurality of rings.

12. The leaf-stripping head of claim 11, further comprising:
a screen fastened to the leaf-stripping head.

13. The leaf-stripping head of the claim 12, further comprising:
a cleaner extending toward and inside of said perforated rotating attraction drum beyond a lateral wall thereof.

14. The leaf-stripping head of claim 13, said cleaner comprising a plurality of superimposed blades fastened on said screen and shaped so as to engage the plurality of openings of said perforated rotating attraction drum during rotation of said perforated rotating attraction drum.

* * * * *